United States Patent [19]

Mihara et al.

[11] Patent Number: 4,942,657
[45] Date of Patent: Jul. 24, 1990

[54] AUTOMATIC CUTTER CHANGE TYPE SHAVING MACHINE

[75] Inventors: Toshihide Mihara, Amagasaki; Yuji Odan, Suita, both of Japan

[73] Assignee: Kanzaki Kokyukoki Mfg. Co. Ltd., Amagasaki, Japan

[21] Appl. No.: 295,726

[22] PCT Filed: Mar. 10, 1987

[86] PCT No.: PCT/JP87/00145
§ 371 Date: Nov. 9, 1988
§ 102(e) Date: Nov. 9, 1988

[87] PCT Pub. No.: WO88/06944
PCT Pub. Date: Sep. 22, 1988

[51] Int. Cl.⁵ ............................................ B23Q 3/157
[52] U.S. Cl. ........................................ 29/568; 409/231
[58] Field of Search ................. 29/568; 409/231, 233, 409/232; 51/166 R, 166 T, 166 TS; 408/56

[56] References Cited

U.S. PATENT DOCUMENTS

| | | | |
|---|---|---|---|
| 3,925,878 | 12/1975 | Kikuchi | 29/569 |
| 4,528,743 | 7/1985 | Bleich | 29/568 |
| 4,641,415 | 2/1987 | Charra | 29/568 |
| 4,780,951 | 11/1988 | Beyer et al. | 29/568 |

FOREIGN PATENT DOCUMENTS

| | | | |
|---|---|---|---|
| 144641 | 9/1982 | Japan | 29/568 |
| 58-33053 | 7/1983 | Japan . | |
| 14831 | 1/1986 | Japan | 29/568 |

*Primary Examiner*—Daniel Howell
*Attorney, Agent, or Firm*—Armstrong, Nikaido, Marmelstein, Kubovcik & Murray

[57] ABSTRACT

Automatic cutter change type shaving machine, wherein a spindle of a cutter head supported movably upward and downward by a column has a cutter loading portion having a mechanism to load and unload a cutter along the axis of said spindle at an end of said spindle and a carriage which moves toward and away from said cutter loading portion carries out load and unload of a cutter for said cutter loading portion through its reciprocating motion.

8 Claims, 10 Drawing Sheets

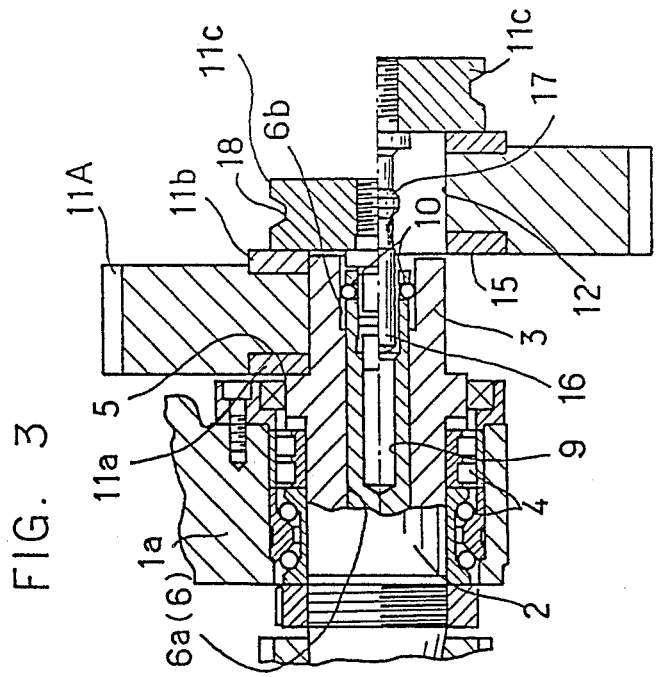

AUTOMATIC CUTTER CHANGE TYPE SHAVING MACHINE

FIELD OF THE INVENTION

This invention relates to an automatic cutter change type shaving machine enabled to automatically change a shaving cutter for a shaving machine used to finish gears.

PRIOR ART

While almost all machine tools are currently equipped with an automatic tool changing mechanism, a shaving machine has not yet been equipped with such an automatic tool changer. This is considered to be for the following reasons: the shaving cutter is thin walled, small thickness for its diameter so that it is almost impossible to load it to the cutter head spindle by taper fitting, and that it is difficult to center so as to fit it to the spindle without tilt; the equipment to manufacture and regrind the cutter is of such construction that handles thin-walled cutters in accordance with the tradition from the development of the shaving machine to date; and the like.

A prior art technique for rapid change of a shaving cutter is disclosed in Japanese Patent Publication No. 33053/1983. According to this known art, the cutter head spindle is constructed to be supported by a sliding portion which is slidable along the spindle axis, and it is constructed so that a plurality of cutters are loaded to the spindle beforehand and only a cutter may be selected at a time and be brought to the machining position by sliding the sliding portion.

In the above known art, in which a cutter is changed by moving the spindle together with the cutter head sliding portion, since a comparatively long structural portion is moved, the number of cutters which can be changed by its movement is limited to two or a maximum of three pieces. Also it takes rather a long time to newly load two or three cutters on the spindle.

The object of the present invention is to provide a new shaving machine enabled to automatically change the cutter by providing the cutter itself with a construction suitable for the automatic change and mechanism to allow such a cutter to fit the spindle without tilt.

SUMMARY OF THE INVENTION

In order to accomplish the above object, the present invention provides an automatic cutter change type shaving machine comprising: a table supported by a supporting bed, a pair of head stocks on said table, a column vertically installed on said supporting bed, a cutter head which is lifted and lowered on said column by a driving motor, a rotary cutter for finishing gears which can be loaded to said cutter head, and a carriage which is allowed to come nearer to or go away from the cutter loaded to said cutter head along said cutter axis by means of a travel driving means in order to change the cutter in said cutter head by attaching or detaching it as required, said cutter head comprising a spindle, a clamp bar and an advance and return driving means; the spindle being rotated by a drive, and comprising a cutter abutting step provided at a shortly retracted position from the end surface at one end of said spindle, a cutter loading portion having a projecting key on the side of the end, and a through hole extending on the spindle axis; the clamp bar being slidably mounted in said through hole, and including a pin supporting hole having an axis aligned with the spindle axis and extending from the end surface on said cutter loading portion, said clamp bar having a clamp member which is provided on said clamp bar wall enclosing said pin supporting hole and loosens or tightens in the radial direction of said pin supporting hole in accordance with the advance or return of said clamp bar; the advance and return driving means being mounted to said spindle at an end on the other side of said cutter loading portion to drive said clamp bar for advance and return, said each cutter comprising: a fitting hole formed concentrically with said cutter, which hole opens on one end surface, is closed on the other end surface by a sealing wall of said cutter, has a keyway for receiving said key and can be fitted to said cutter loading portion; a locating end surface which abuts on said cutter locating step when loaded to said cutter loading portion; and a pin which extends with its axis aligned with the cutter axis from said sealing wall, through said fitting hole, and beyond said locating end surface, said pin being tightly inserted into said pin supporting hole when loaded to said cutter loading portion, said pin having a clamping portion which can be clamped through said clamp member when said clamp bar slides in said inserted state, and a portion to be gripped provided at the end of the cutter on the other side of said locating end surface, said carriage comprising: a cutter change arm which is rotatably mounted to a supporting shaft extending at right angles with the travel direction of said carriage and is rotated so that either one end surface or the other end surface is selected and brought to a position facing said cutter loading portion, said cutter change arm having on said each end surface a cutter phase setting instrument to make the rotational phase constant in the cutter circumferential direction, and a patch which lies on the axis of said spindle when said each end surface is located at said facing position; a rotating driving means to rotate said cutter change arm; a movable chucking means which is provided on each end surface of said cutter change arm and is constructed so that said cutter is gripped by said portion to be gripped while the cutter is abutted on by said patch at the central position and the rotational phase has been determined by said cutter phase setting instrument; and a chuck driving means which is mounted on said cutter change arm and selectively operates said movable chucking means on each end surface of said change arm to permit the chuck driving means to grip the cutter.

RESULTS OF THE INVENTION

The present invention provides an automatic cutter change type shaving machine capable of rapidly changing the cutter without the number of the cutters being limited as described below. That is, the cutter loaded on the shaving machine body is accurately and rapidly located in every direction of the cutter in the following ways: the cutter is located in its thickness direction by abutting of the cutter locating end surface on the cutter locating step of the spindle end portion; radial centering is performed by passing the pin which projects through the fitting hole of the cutter from one end surface of the cutter through the pin supporting hole in the clamp bar within the spindle; and when loading to the cutter change arm, the rotational phase in the circumferential direction is determined by the cutter phase setting instrument to load to the spindle. The cutter is held by the movable chucking means of the cutter change arm and is moved to a position facing the shaft end surface when the carriage travels. Then the cutter is pushed along the spindle axis by the said cutter change arm patch and therefore the pin is smoothly inserted into the pin supporting hole without tilt. After inserting the pin, clamping is rapidly and securely performed by the clamp member and the clamped portion when the clamp bar slides in the axial direction. Since the cutter change arm is designed to rotate so that either one end surface or the other end surface is selected and brought to a position facing the cutter loading portion, it is possible to allow said cutter change arm to hold the next cutter to be used while the loaded cutter is being used for machining. The moment the machining is finished, the carriage is allowed to travel to the cutter loading portion in order to allow one end surface of the cutter change arm to hold the cutter used, and thereafter the cutter change arm is reversed to load the spindle with a cutter on the other end surface, thus reducing the time required for changing the cutter.

BRIEF DESCRIPTION OF THE DRAWINGS

This invention will be further clarified by the description of embodiments with reference to the following accompanying drawings. The invention is not limitted to these embodiments, but various modifications are possible without deviation from the scope of the claims.

The drawings show a shaving machine according to the present invention.

FIG. 2 is a front view of the principal part partially shown in a state different from that of FIG. 1.

FIG. 3 is a front view showing modifications of what are depicted in FIGS. 1 and 2.

DESCRIPTION OF THE PREFERRED EMBODIMENTS

Figure 8:
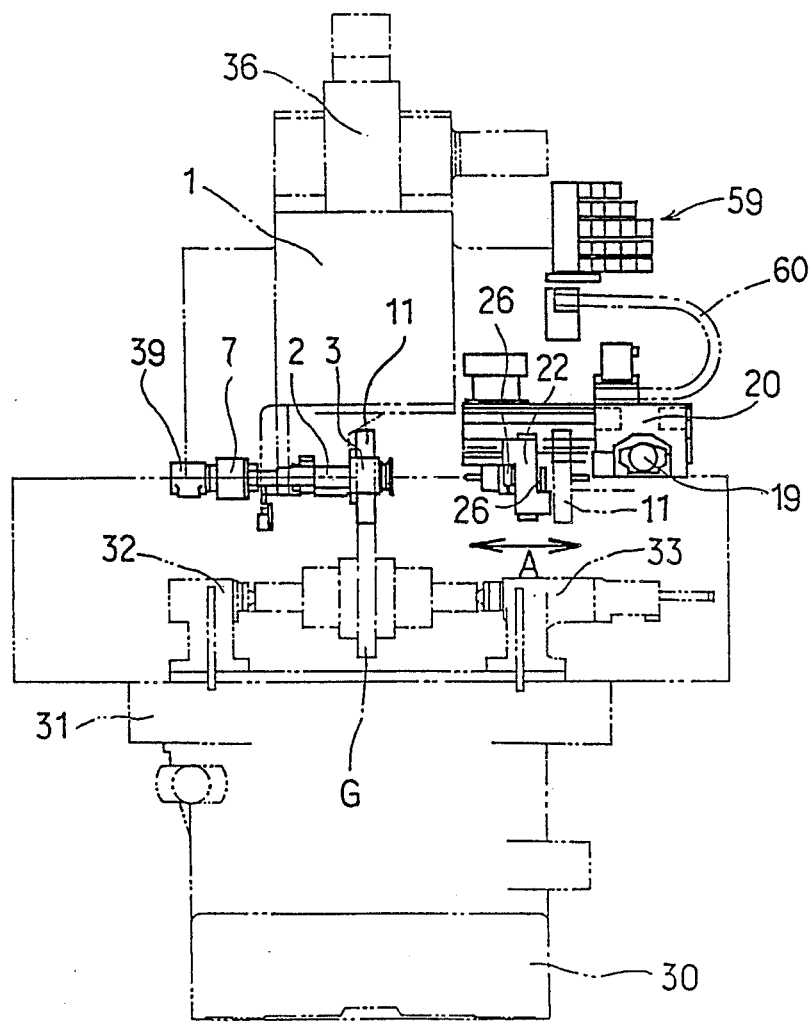
FIG. 8 is a schematic front view of the shaving machine in its entirety.
Figure 9:
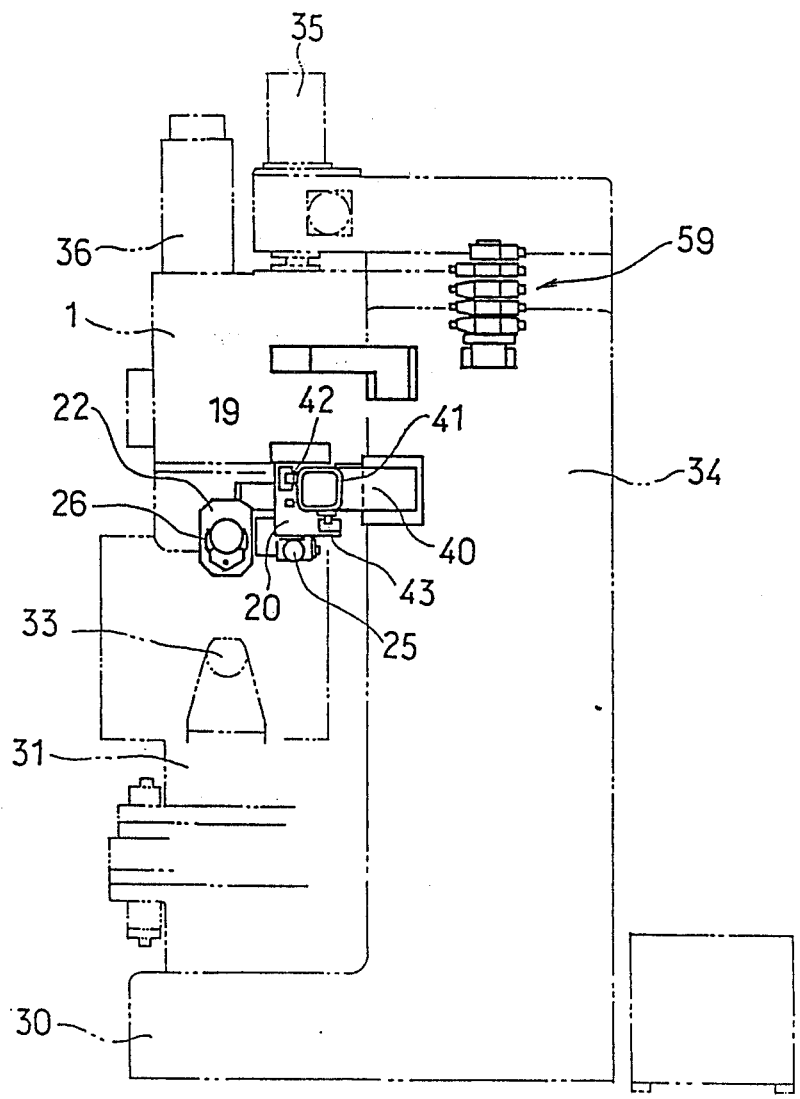
FIG. 9 is a schematic side elevation of the shaving machine in its entirety.
Figure 10:
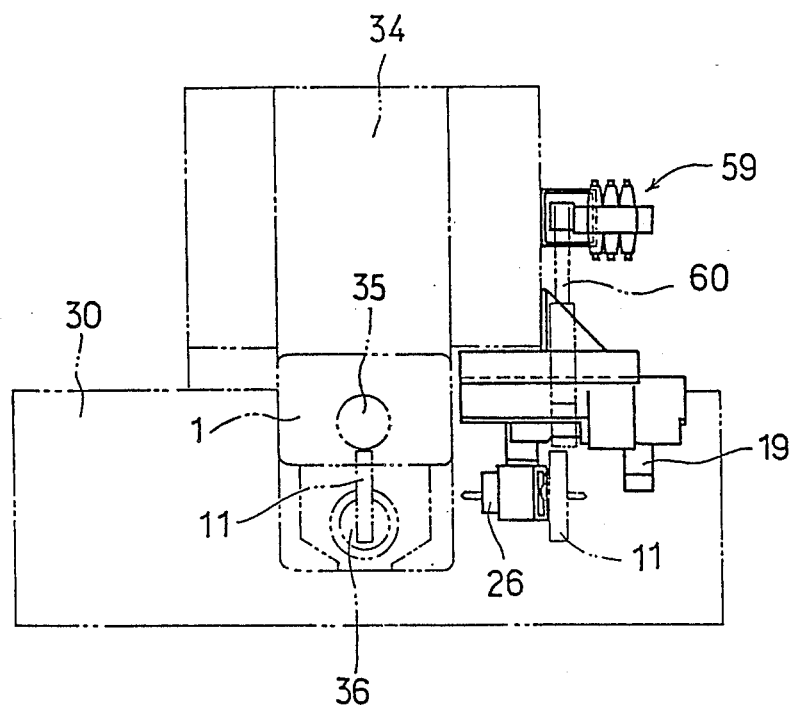
FIG. 10 is a schematic plan view of the shaving machine in its entirety.

The construction of the shaving machine body in which embodiments of the present invention are incorporated is typically illustrated in FIGS. 8 to 10, and similar to a as conventional machine body.

That is, on the upper surface of table 31 installed on supporting bed 30 in the lower portion of the machine, right and left head stocks 32 and 33 are provided to support a gear G to be machined, and said cutter head 1 is supported by column 34 vertically installed on bed 30 so that it can be raised and lowered and can be rotated around the vertical axis passing through the gear machining position. To raise and lower cutter head 1, an elevating driving motor 35 is mounted atop the column 34, and to rotate spindle 2 of cutter head 1, cutter driving motor 36 is mounted atop the cutter head 1.

Figure 1:
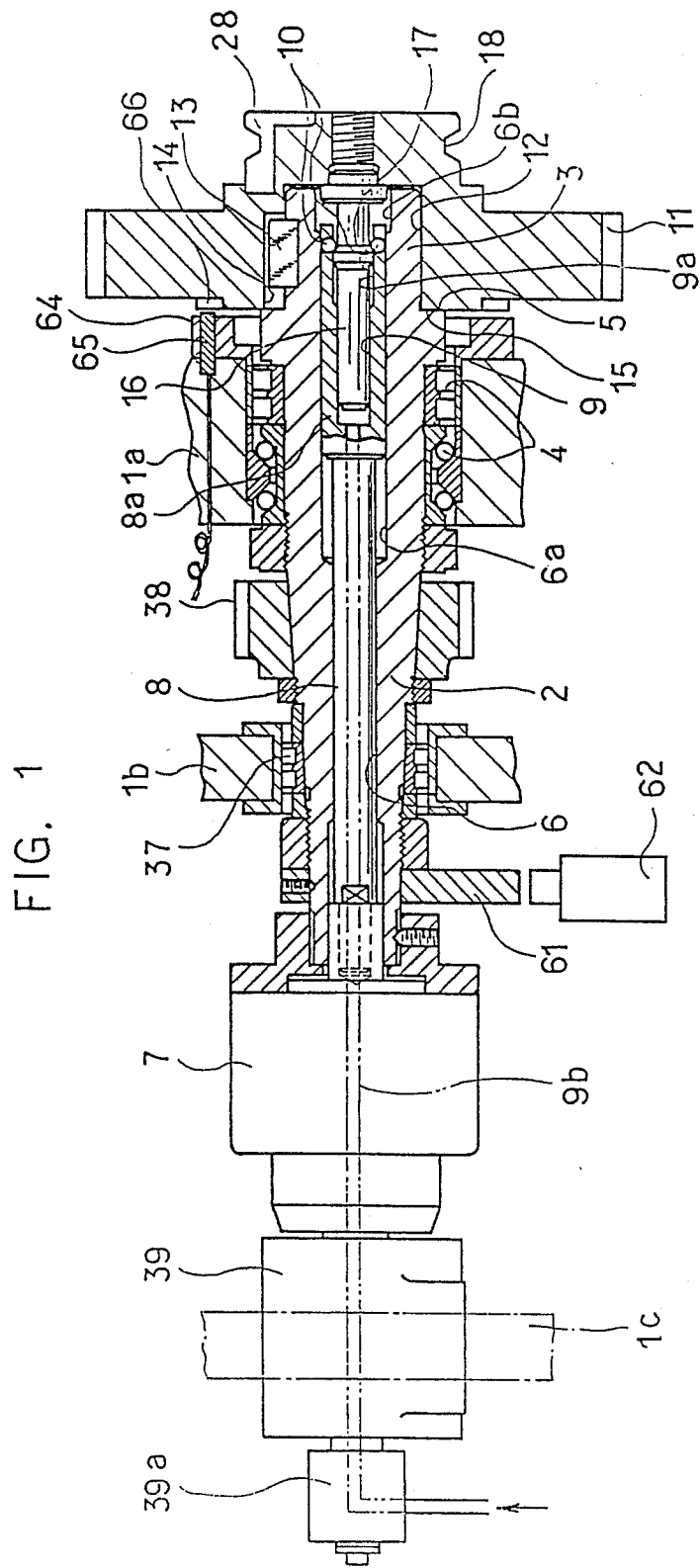
FIG. 1 is a front view of the principal part of the shaving machine.

In this shaving machine, cutter loading portion 3 in cutter head 1 (FIGS. 8 and 9) is provided at one end of spindle 2 as shown in FIG. 1. On spindle 2, cutter locating step 5 is formed at the inner end of cutter loading portion 3, and through hole 6 is formed in spindle 2 on its axis.

A through hole 6 of spindle 2 supports clamp bar 8, which is allowed to advance and return by an advance and return driving means 7 mounted to spindle 2 on the other side of cutter loading portion 3.

This clamp bar 8 extends from adjacent the end surface of cutter loading portion 3 to rotary joints 39 and 39a as mentioned later through the inside of the advance and return driving means 7. The clamp bar 8 is composed of a pin supporting hole 9 extending coaxially of spindle 2 from the end surface of cutter loading portion 3, and fine fluid passage for cleaning 9b extending from the innermost end of pin supporting hole 9 through rotary joint 39a.

As shown in FIG. 1, spindle 2 is supported by a front support 1a and rear support 1b in the cutter head 1 through bearings 4 and 37 respectively, and a gear 38 driven by a cutter driving motor 36 is provided near the rear support 1b on spindle 2. An advance and return driving means 7 has a hydraulic cylinder piston mechanism which rotates with spindle 2. On spindle 2, a rotary joint 39 is provided to feed oil to the advance and return driving means 7 on the rear side (on the opposite side of cutter loading portion 3) of the driving means, and is supported by a support 1c in the cutter head 1. Behind the rotary joint 39 on spindle 2, a rotary joint 39a is also provided to feed fluid for cleaning to fluid passage for cleaning 9b.

Spindle 2 is designed to selectively load the cutter 11 to the cutter loading portion 3, and accordingly each cutter 11 has the following construction. That is, cutter 11 is provided with a fitting hole 12 to fit in the cutter loading portion 3, which hole is concentric with the cutter axis and sealed at one end. Cutter 11 also includes a locating end surface 15 which is allowed to abut on the cutter locating step 5 on spindle 2. The fitting hole 12 has a keyway 14 which fits a key 13 on cutter loading portion 3. The cutter 11 also includes (i) a pin 16 which extends coaxially with the cutter from the sealed end surface of the fitting hole 12 and projects beyond a locating end surface 15 when it is loaded to the cutter loading portion 3, and (ii) portion to be gripped 18 formed at the end on the other side of the locating end surface 15. The pin 16 has a portion to be clamped 17 which is clamped by a clamp member 10 when the clamp bar 8 returns.

As shown in FIGS. 1 and 2, a through hole 6 of the spindle 2 has a large diameter hole 6a on the side toward the cutter loading portion 3, while the clamp bar 8 has a large diameter portion 8a at the end portion, which fits in said large diameter hole 6a. Said pin supporting hole 9 is formed in said large diameter portion 8a. The end portion of this pin supporting hole 9 is formed as a large diameter hole 9a to such an extent that pin 16 is inserted as far as near the position shown in FIG. 2, and the inner end of this large diameter hole 9a and the tip of pin 16 are chamferred respectively as shown in the drawings. The end of cutter loading portion 3 and the end of fitting hole 12 are also chamferred similarly.

On the outer side of large diameter hole 6a of through hole 6 in spindle 2, an expanded hole 6b with its inside diameter further enlarged is provided. As shown in FIG. 2 clamp member 10 in clamp bar 8 is constructed so that clamp bar 8 is provided with radial holes which is brought to a position at the inner end of the expanded hole 6b on advancement of clamp bar 8. Said holes support a plurality of balls. The portion to be clamped 17 in pin 16 of cutter 11 is constructed by slightly enlarging the diameter of the intermediate portion of said pin 16 and by tapering the end surface of said larger diameter portion near the base of pin 16. When clamp bar 8 returns as shown in FIG. 1, clamp member 10 is shifted to large diameter hole 6a, less in diameter, from expanded hole 6b, and at this time, is pressed inward in the radial direction by the inner circumferential surface of said hole 6a to be pressed against the portion 17.

As shown in FIGS. 1 and 2, a locating end surface 15 of cutter 11 is a boss end surface which slightly projects in the axial direction from cutter 11, and pin 16 is provided by thread-mounting its base onto the cutter body 11. The portion 18 of cutter 11 has a circular groove having a V-shape in cross section.

FIG. 3 shows an example of a cutter 11 obtained by modifying a commercially available cutter 11A. One end surface of the existing cutter 11A is mounted with a ring 11a providing a locating end surface 15, and the other end surface is mounted with another ring 11b and a metal member 11c having a circular groove having a V-shape in cross section which provides a portion to be gripped 18, and then pin 16 is thread-mounted onto the metal member 11c. In the above members 11a, 11b, 11c, 16, ring 11a, 11b and metal member 11c, which become an attachment for the existing cutter 11A, can be loaded to the commercially available cutter 11A by such a clamping tool as, for example, a countersunk screw. Such a cutter 11 can be also used in the same manner as a cutter 11 shown in FIGS. 1 and 2. FIG. 3 shows the upper half of the cutter in the same state as FIG. 1 and the lower half in the same state as FIG. 2.

Figure 4:
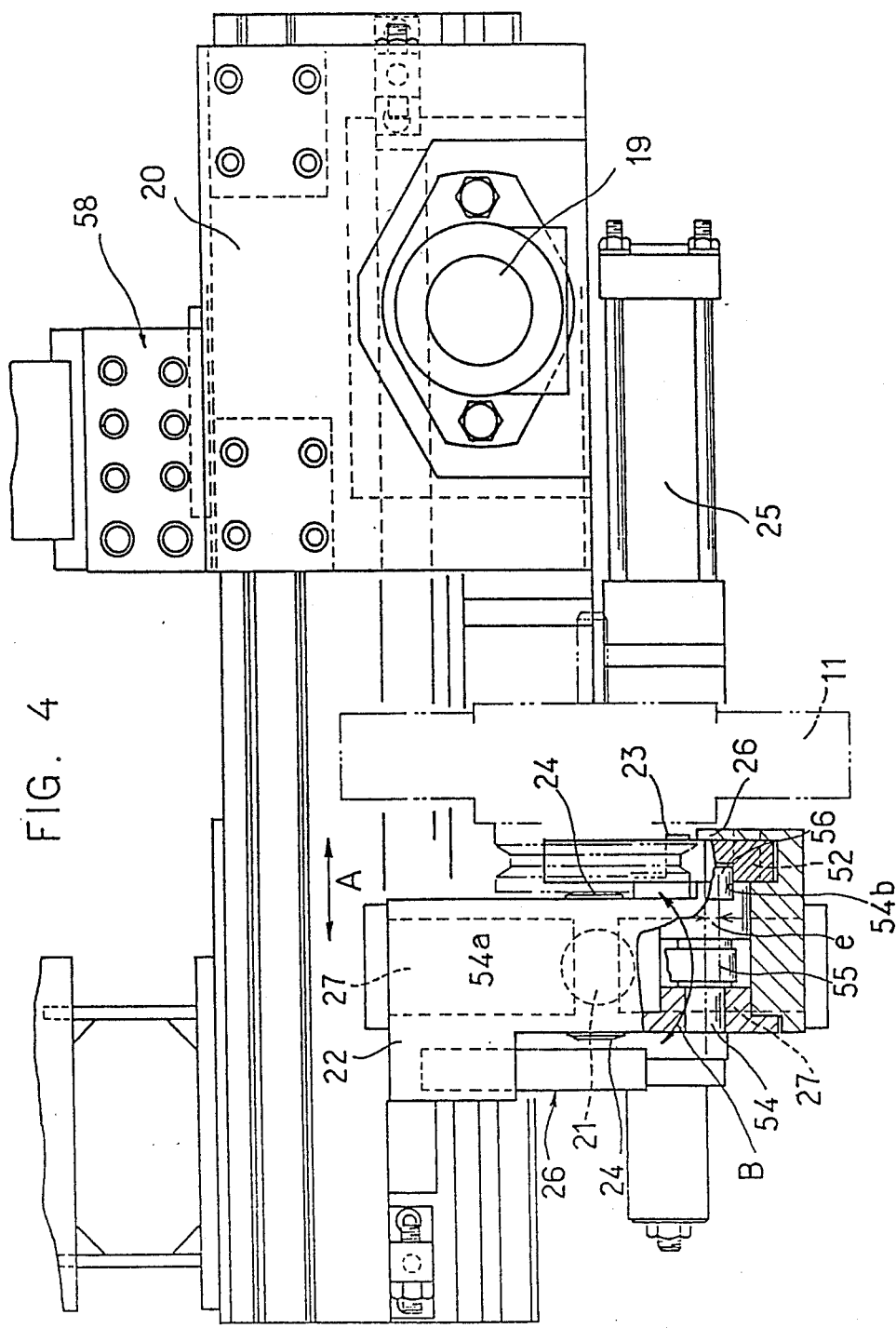
FIG. 4 is a front view partially showing other principal part in vertical section.
Figure 5:
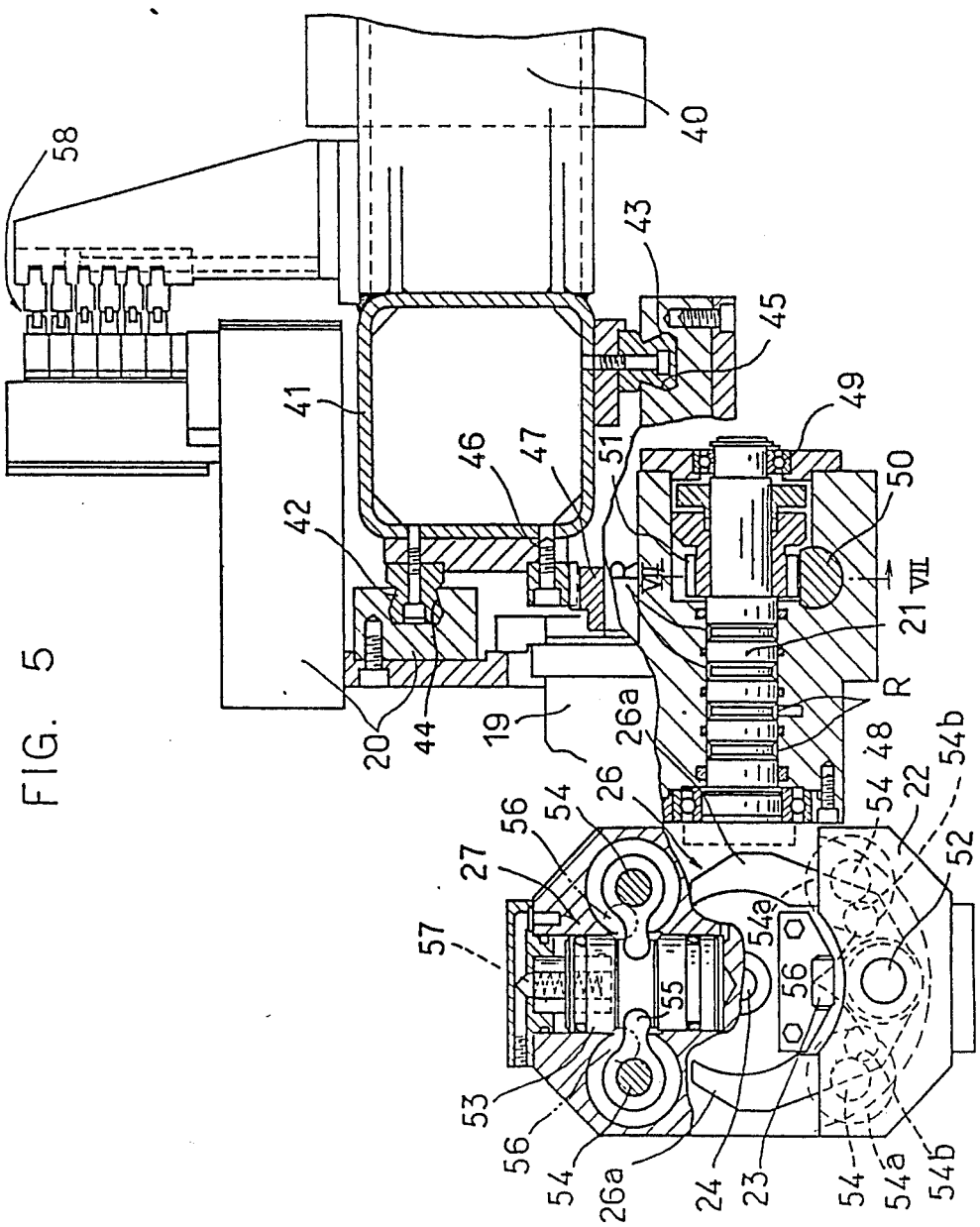
FIG. 5 is a side elevation of another principal part in vertical section.
Figure 6:
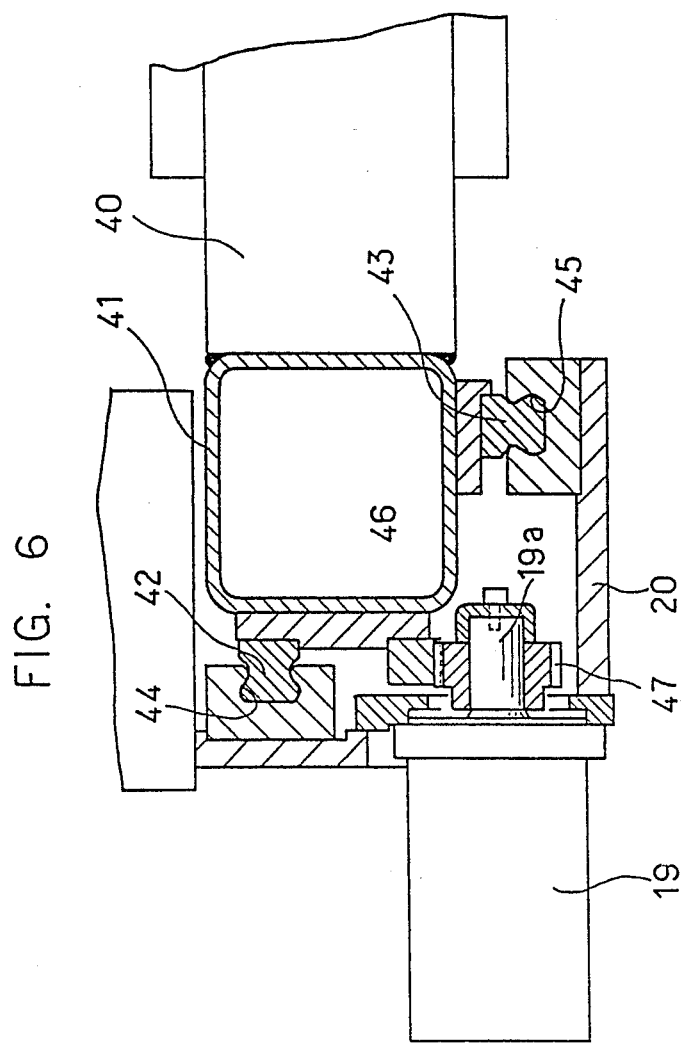
FIG. 6 is a side elevation partially showing the other principal part of FIG. 5 in another vertical section.

As shown in FIG. 9, column 34 is mounted with a supporting frame 40 projecting forward, and a square type pipe 41 extending in a lateral direction is secured by welding to the end of this supporting frame 40. The square pipe 41 is mounted with rails 42 and 43 on the front and lower surfaces as shown in FIGS. 5 and 6. A carriage 20 has rail grooves 44 and 45 to be dovetail fitted to these rails 42 and 43, and is enabled to travel along the rails 42 and 43. That is, the carriage is allowed to travel in such a direction as to come nearer to and go away from the cutter loading portion 3 as indicated by arrow A in FIG. 8. A travel driving means 19 for carriage 20 is composed of hydraulic motor mounted to the carriage 20 itself. That is, a rack 46 which is laid along rails 42 and 43 is secured to the square pipe 41, and pinion 47 which engages said rack 46 is provided on a motor shaft 19a of the hydraulic motor (a travel driving means) 19 mounted on the front surface of the carriage 20 as shown in FIGS. 5 and 6. The carriage 20 travels when pinion 47 rotates while engaging rack 46. Alternatively the travel driving means 19 may be constructed by a hydraulic cylinder secured on the supporting frame 40, or the carriage 20 may be allowed to travel through a feed screw mechanism, etc. As shown in FIGS. 4 and 5, said carriage 20 has a cutter change arm 22 which is provided to rotate around a shaft 21 extending perpendicularly to the travel direction. This rotation allows the cutter change arm 22 to bring either one end surface thereof or the other end surface thereof to a position facing the cutter loading portion 3. Each end surface of this cutter change arm 22 is provided, according to the example, with a cutter phase setting instrument 23 composed of keys and with a patch 24 which is located concentrically with spindle 2 when either said end surface is placed facing the cutter loading portion 3.

Figure 7:
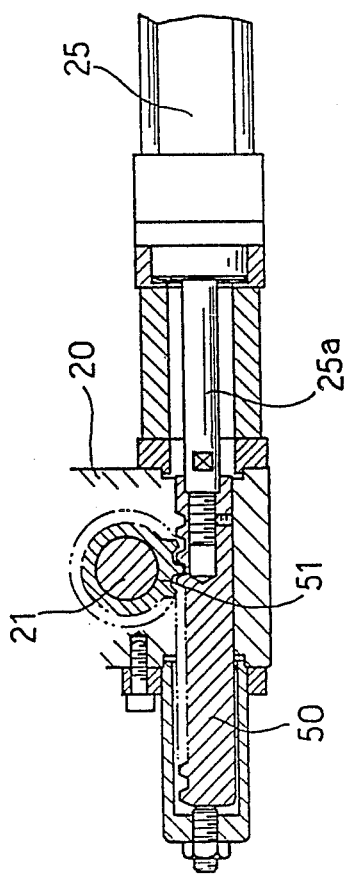
FIG. 7 is a sectional view taken along the VII—VII line of FIG. 5.

The carriage 20 includes, as shown in FIGS. 4 and 5, a rotation driving means 25 which rotates the cutter change arm 22 around the shaft 21 as indicated by arrow B in FIG. 4, a pair of movable chucking means 26 provided on both end surfaces of cutter change arm 22, and a pair of chuck driving means 27 which is provided in cutter change arm 22 and selectively operates said a pair of movable chucking means 26 to grip a cutter. Shaft 21 is secured to cutter change arm 22 as shown in FIG. 5, and is rotatably supported by carriage 20 through a pair of bearings 48 and 49. The rotation driving means 25 has hydraulic cylinder piston mechanism, and rotate shaft 21 together with cutter change arm 22 by a rack 50 mounted to piston rod 25a meshing with a pinion 51 on shaft 21 as shown in FIG. 7.

Each chucking means 26 has a pair of fingers 26a which are supported by cutter change arm 22 to rotate around a common shaft 52 as shown in FIGS. 4 and 5. Both fingers 26a have an arc-shaped inner surface, and, due to the rotation of the cutter change arm 22, turns the free end downward on the side facing cutter loading portion 3, and turns the free end upward on its other side. Each chucking means 26 is constructed so that the chucking means grips the cutter 11 at the portion 18 after a patch 24 has abutted on cutter 11 at the central position of said cutter and the phase of cutter 11 has been determined by cutter phase setting instrument 23. The cutter 11 has a notched groove 28 formed in the end surface of portion 18 for engagement with phase setting instrument 23 as shown in FIGS. 1 and 2. Each chuck driving means 27 has a double-acting type hydraulic cylinder piston mechanism equipped with a piston 53 as shown in FIGS. 4 and 5. A shaft 54 is rotatably supported on the cutter change arm 22 on the sideways of piston 53. A protrusion of an engager 55 secured to each shaft 54 is allowed to engage a piston 53 by projecting the protrusion into a hole on the circumferential surface of said piston 53, and each shaft 54 is designed to rotate by the rotation of engager 55 when piston 53 advances or returns. On radially outer portion of the end surface of a large diameter portion 54a provided on each shaft 54, arc-shaped (in front view) pin supporting hole 54b is formed. In this pin supporting hole 54b, an eccentric driving pin 56 supported by each finger 26a is inserted, and each finger 26a is allowed to rotate in a direction or in another direction when a shaft 54 rotates in a direction or in another direction in accordance with an eccentricity e (FIG. 4) between shaft 54 and eccentric driving pin 56.

A rotary joint R (FIG. 5) of a hydraulic feed and discharge passage for the hydraulic cylinder of chuck driving means 27 is formed so that the outer circumferential surface of shaft 21 with circular grooves is sealed by the inner circumferential wall of the hole in the housing of carriage 20. Since there are two hydraulic cylinders and two hydraulic chambers are required for each to reciprocate each hydraulic cylinder, four above mentioned rotary joints R are provided. Each rotary joint R is connected to above each hydraulic chamber through oil passage within shaft 21 and oil passage within cutter change arm 22. Each hydraulic cylinder has a spring 57 which urges a piston 53 to move chucking means 26 whereupon chucking means 26 is caused to hold cutter 11 on accidental stop of the hydraulic pump due to power failure, etc.

To locate the carriage 20, a limit switch mechanism 58 is provided as shown in FIGS. 4 and 5. Also as shown in FIGS. 8 to 10, a hydraulic circuit selector valve 59 is provided for column 34, and hydraulic hose 60 is provided between this selector valve 59 and carriage 20. As shown in FIG. 1, a phase detecting means for spindle 2 consists of a magnetic body 61 secured to the side of spindle 2 and a magnetic sensor 62 facing the side thereof, and said phase detecting means detects for orientation to stop said spindle 2 when a key 13 for spindle 2 is in a specific phase. Spindle 2 is attached with a flange 64 outward said locating step so that the front end surface of the flange is located at a somewhat retracted position from the locating step 5, and said flange 64 is mounted with a magnetic sensor 65 with the sensing element exposed on said front end surface. On the other hand, a magnetic body 66 is located annualy and concentrically with the outer circumference of cutter 11 at a position facing a magnetic sensor 65 in the end surface of cutter 11, and a means for checking the cutter setting accuracy consists of the magnetic body 66 and magnetic sensor 65.

OPERATIONS OF THE INVENTION

This shaving machine supports a cutter 11 on cutter loading portion 3 of spindle 2 as shown in FIG. 1. While pin 16 of cutter 11 is supported by pin supporting hole 9 of clamp bar 8 and key 13 on spindle 2 is allowed to fit keyway 14 of cutter 11, cutter loading portion 3 is inserted into fitting hole 12, and pin 16 of cutter 11 is clamped at portion 17 through clamp member 10 by retracting clamp bar 8, whereupon the shaving machine starts machining. Accordingly, cutter 11 is rotated together with spindle 2 connected thereto by key 13, and is prevented from coming off cutter loading portion 3 by clamp bar 8.

In changing a cutter 11, chucking means 26 on a side (left side in the drawing) facing cutter loading portion 3 is made empty as shown in FIG. 4. Then the cutter change arm 22 is permitted to hold a cutter 11 ready to be loaded next time to chucking means 26 on the other side, and said cutter change arm 22 is caused to advance toward cutter loading portion 3 by the travel of carriage 20 in order to allow the empty chucking means 26 to bring such a position as to grip the cutter 11 on spindle 2. At this time, the phase setting instrument 23 on cutter change arm 22 fits a notched groove 28 of cutter 11 on spindle 2. The chuck driving means 27 operates the empty chucking means 26 to allow it to grip the portion 18 of cutter 11 on spindle 2. The advance and return driving means 7 allows clamp bar 8 to advance in order to unclamp said cutter 11.

Then the travel of carriage 20 in the reverse direction retracts cutter change arm 22 to go away from cutter loading portion 3, and at this time, cutter 11 on spindle 2 is removed while it is being held by chucking means 26. When carriage 20 and cutter change arm 22 have returned and cutter change arm 22 has been rotated 180 degrees around shaft 21 by rotation driving means 25, a new cutter 11 which is held by another chucking means 26 is brought to a position facing cutter loading portion 3. Then allow carriage 20 to advance again in order to allow the new cutter 11 to reach immediately before the position where the end of fitting hole 12 enters the end of cutter loading portion 3 as shown in FIG. 2. At near this position, a portion of pin 16 of cutter 11 has already entered the pin supporting hole 9 of clamp bar 8. From immediately before the position shown in FIG. 2, the forward speed of carriage 20 by travel driving means 19 is reduced to low speed, and cutter 11 is pressed through change arm 22 by the portion 18 held by chucking means 26 and the central portion abutted by patch 24. When fitting hole 12 has slightly entered cutter loading portion 3, chuck driving means 27 releases the holding operation of chucking means 26, and cutter change arm 22 presses cutter 11 only with the patch 24. Since the central portion of cutter 11 is slowly pressed with the chucking means 26 released in this way, cutter 11 fits the loading portion 3 while being corrected so that it is precisely located concentrically with spindle 2 in accordance with guide of pin 16 through pin supporting hole 9 and guide of the inner circumferential surface of fitting hole 12 through cutter loading portion 3. In such a fitting process, cutter 11, whose phase has been determined by cutter phase setting apparatus 23 on cutter change arm 22, fits keyway 14 through key 13 on spindle 2.

When a new cutter 11 fits cutter loading portion 3, the advance and return driving means 7 retracts clamp bar 8 to clamp the cutter 11. At this time, the locating end surface 15 of cutter 11 is precisely abutted on the locating step 5 on spindle 2 to locate the cutter 11 in the axial direction of spindle 2. Retracting carriage 20 thereafter completes the change of cutter 11. The chucking means 26 on the other side of cutter loading portion 3 in cutter change arm 22 on the retracted carriage 20 is allowed beforehand to hold a next cutter to be used during machining with the cutter loaded right now.

Figure 11:
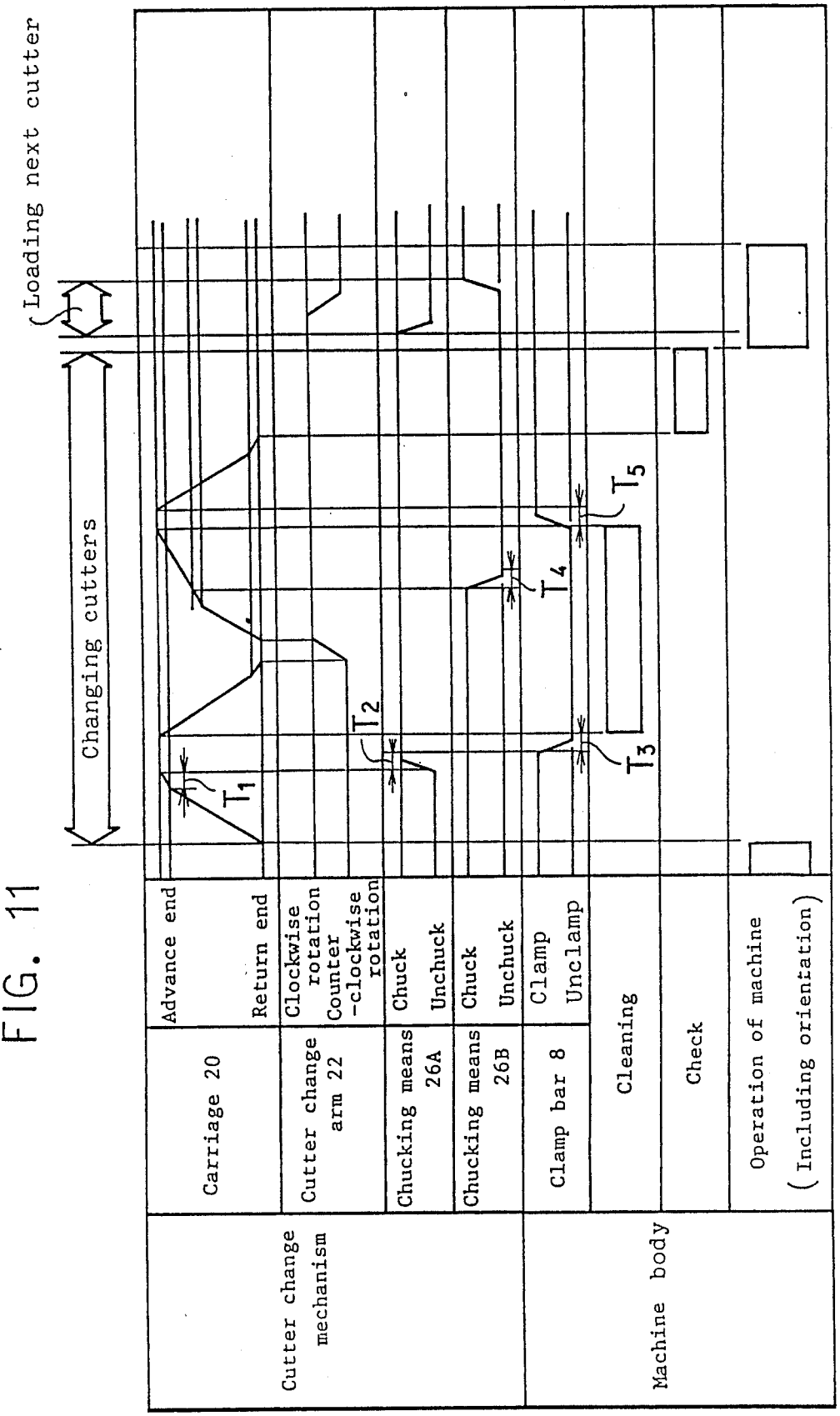
FIG. 11 is a sequence diagram for explaining the mode of cutter changes.

FIG. 11 is a sequence chart showing the changes of cutter 11 in a shaving machine as shown in the drawings in relation to the setup on the shaving machine body. Out of a pair of chucking means 26 in the chart, a chucking means facing the cutter loading portion 3 during operation of the machine is indicated by 26A, and chucking means on the other side is indicated by 26B. Also in the chart, gripping the cutter by each chucking means 26A and 26B is called "Chuck" and releasing the grip is called "Unchuck". Clamping the cutter 11 by retracting of clamp bar 8 is called "Clamp", and releasing the clamp by forwarding is called "Unclamp".

Chucking means 26B has been allowed to hold a next cutter 11 to be used during operation of the machine. As shown in the lowest column of FIG. 11, carriage 20 is allowed to advance from the return end to the advance end the moment the operation of the machine is finished. The speed is reduced to low speed during the last short time $T_1$ of this advance in order to reduce the impact when the patch 24 on cutter change arm 22 abuts on the cutter 11 on cutter loading portion 3. The moment carriage 20 reaches the advance end, chucking means 26A is allowed to operate, and grips cutter 11 on cutter loading portion 3. During a lapse of preset time $T_2$ of a timer which starts when carriage 20 reaches the advance end, clamp bar 8 is allowed to advance in order to unclamp cutter 11 on cutter loading portion 3. During lapse of preset time $T_3$ of a timer which starts when clamp bar 8 starts to advance, carriage 20 is retracted.

The moment carriage 20 reaches the return end, cutter change arm 22 is allowed to rotate in order to turn the chucking means 26B holding a next cutter 11 toward a position facing cutter loading portion 3. After such a rotation of cutter change arm 22, carriage 20 is allowed to advance immediately and the advance speed of carriage 20 starts to reduce when cutter 11 has been brought to near a position as shown in FIG. 2. Since cutter 11 has abutted on cutter loading portion 3 of spindle 2 at the end of fitting hole 12, the holding by chucking means 26 is released during a preset time $T_4$ by a timer, and thereafter carriage 20 presses cutter 11 through patch 24 as mentioned above to allow it to fit cutter loading portion 3. The moment carriage 20 reaches the advance end, clamp bar 8 is retracted to clamp cutter 11, and carriage 20 is retracted during a lapse of preset time $T_5$ of a timer which starts when clamp bar 8 starts to return. Cuttings adhered to spindle 2 are cleaned using injection cleaning oil in this machine, and such cleaning is performed during a period of time from the start of return of carriage 20 to re-advance to the forefront end. When the tip of pin 16 of cutter 11 is near the outlet of through hole 6 of spindle 2 during advance and return of carriage 20, cleaning fluid is injected from cleaning fluid passage 9b to further carefully clean cuttings, etc. adhered to pin 16.

When carriage 20 returns to the return end, whether or not a new cutter 11 has been loaded as required, and the like are checked. As one of these checks, it is judged using the above mentioned means for checking the cutter setting accuracy whether or not the magnetic body 66 of cutter 11 is properly located as specified toward the magnetic sensor 65 during 1 revolution of spindle 2. After the checks are finished, the operation of the machine is started. The operation of the machine includes the above mentioned orientation utilizing the phase detecting means consisting of said magnetic body 61 and magnetic sensor 62. During the operation of this machine, the tool change is performed by removing a cutter 11 used from chucking means 26A of tool change arm 22, and allowing chucking means 26B to hold a next cutter 11 to be used. This tool change may be performed by providing an automatic tool changer (ATC) used for a normal machining center, etc. at the return position of carriage 20 and by collecting the cutters used and loading the next cutter by using chucking means which is allowed to repeatedly move to the position for delivery of the cutter to cutter loading portion 3 in said tool changer.

We claim:

1. An automatic cutter changing shaving machine comprising:

a support bed, a table and vertical column supported by said support bed, a pair of head stocks on said table, a cutter head mounted for vertical movement on said column by a driving motor, a plurality of rotary cutters which can be loaded to said cutter head for finishing gears, and a carriage movable toward and away from said rotary cutter head along an axis of rotation of one of said cutters by travel driving means for positioning said carriage for attachment and detachment of one of said rotary cutters relative to said cutter head, said cutter head including a spindle having a through hole extending along the spindle axis, said spindle having a cutter abutting step spaced from an end surface at one end of said spindle and a peripheral surface defining a cutter loading portion between said cutter abutting step and said end surface, a key projecting radially from said peripheral surface, a clamp bar slidably mounted in said through hole and having an end surface near said cutter loading portion of said spindle, said clamp bar having a pin supporting hole coaxial with the spindle axis and extending internally from said end surface of said clamp bar and a clamp member carried by said clamp bar and operable to move radially outward and inward relative to said pin supporting hole in response to advance and retracting movement of said clamp bar in said through hole, means for rotating said spindle and driving means for slidably moving said clamp bar in said through hole to selectively advance and retract said clamp bar relative to said one end of said spindle, said driving means for slidably moving said clamp bar being mounted to an end of said spindle opposite to said one end of said spindle, each of said rotary cutters having a fitting hole formed concentric with said cutter, each fitting hole including a keyway and being open at one end surface of said cutter and closed at the other end by a sealing wall of said cutter, a cutter locating end surface at said open end surface of said cutter, a pin having an axis aligned with the axis of said rotary cutter and projecting from said sealing wall of said cutter beyond said cutter locating end surface, said pin having a diameter to be slidably received in said pin supporting hole and a clamping portion adapted for engagement with said clamp member when said driving means retracts said clamp bar, and a gripping portion provided externally of said other end of said rotary cutter, said fitting hole and keyway being adapted to slidably receive said cutter loading portion and said key of said spindle with said pin slidably received in said pin supporting hole and said clamping portion in position for selective engagement and disengagement with said clamp member, said carriage including a cutter change arm rotatably mounted to said carriage for rotation about an axis extending at a right angle relative to the direction of movement of said carriage and having first and second end surfaces which can be selectively moved to a position facing said cutter loading portion of said spindle by rotation of said cutter change arm, and chuck driving means, each of said end surfaces of said cutter change arm having a cutter phase setting instrument to maintain a constant rotational position of each cutter in a circumferential direction relative to said cutter loading portion of said spindle, a patch aligned with the spindle axis when each of said first and second surfaces is moved to said position facing said cutter loading portion, and movable chucking means selectively operable by said chuck driving means to grip and release said gripping portion of one of said rotary cutters when the rotary cutter is abutted by said patch and the constant rotational position of said rotary cutter has been determined by said phase setting instrument.

2. The automatic cutter changing shaving machine defined by claim 1, further including:

a pair of rails secured to said column and extending in a direction parallel to said spindle axis and said carriage includes means supporting said carriage for movement along said rails.

3. The automatic cutter changing shaving machine defined by claim 2 wherein said travel driving means for positioning said carriage includes a hydraulic motor mounted to said carriage, a stationary rack secured in a position parallel to said rails and a pinion fixed to a rotary output shaft of said hydraulic motor and engaging said rack.

4. The automatic cutter changing shaving machine according to any of claims 1, 2 or 3 wherein said cutter phase setting instrument is a key which projects from each end surface of said cutter change arm, and each of said rotary cutters has an axially extending notched groove which receives said key.

5. The shaving machine according to claim 1 wherein said movable chucking means at each of said first and second end surfaces of said cutter change arm is comprised of a pair of fingers mounted to rotate around a common shaft and having an arc-shaped inner surface, and the gripping portion of said cutter is a circular groove having a V-shaped cross section for receiving said fingers.

6. The automatic cutter changing shaving machine defined by claim 1, wherein an internally extending portion of said pin supporting hole is connected to a larger diameter portion of said hole opening through said end surface of said clamp bar by a chamfered transition zone.

7. The automatic cutter changing shaving machine defined by claim 1, wherein said through hole of said spindle includes a portion of expanded diameter which opens through said end surface at said one end of said spindle and is connected to an internal portion of said through hole by a chamfered transition, said clamp member is comprised of a plurality of balls and holes extending radially through said clamp member to intersect said pin supporting hole with each of said balls in one of said radially extending holes and movable radially outward and inward by said chamfered transition of said through hole, and said clamping portion of said rotary cutter pin is a larger diameter intermediate portion of said pin tapered toward said sealing wall of said rotary cutter and said balls abut said tapered intermediate portion of said pin when said balls are moved radially inward by said chamfered transition to hold said pin internally of said pin supporting hole.

8. The automatic cutter changing shaving machine according to claim 1 wherein the end of said spindle opposite to said cutter loading portion is provided with a rotary joint for feeding cleaning fluid, said clamp bar extends within said spindle to said rotary joint and said clamp bar has a cleaning fluid passage which extends from the innermost end of said pin supporting hole to said rotary joint.

* * * * *